US009890335B2

(12) United States Patent
Zink et al.

(10) Patent No.: US 9,890,335 B2
(45) Date of Patent: Feb. 13, 2018

(54) METHODS AND SYSTEMS FOR REMOVING SULFUR COMPOUNDS FROM A HYDROCARBON STREAM

(71) Applicant: UOP LLC, Des Plaines, IL (US)

(72) Inventors: Steven F. Zink, Westmont, IL (US); John Edward Kulach, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 831 days.

(21) Appl. No.: 14/337,439

(22) Filed: Jul. 22, 2014

(65) Prior Publication Data

US 2016/0024396 A1    Jan. 28, 2016

(51) Int. Cl.
  *C10G 45/08* (2006.01)
  *C10G 67/02* (2006.01)
  *B01J 8/02* (2006.01)
  *C10G 67/04* (2006.01)
  *C10G 7/00* (2006.01)
  *C10G 21/06* (2006.01)

(52) U.S. Cl.
  CPC ............. *C10G 45/08* (2013.01); *B01J 8/02* (2013.01); *C10G 7/00* (2013.01); *C10G 21/06* (2013.01); *C10G 67/02* (2013.01); *C10G 67/04* (2013.01); *C10G 2300/202* (2013.01); *C10G 2400/04* (2013.01); *C10G 2400/08* (2013.01)

(58) Field of Classification Search
  CPC ...... C10G 45/02; C10G 45/08; C10G 49/002; C10G 49/22; C10G 2300/202; B01J 8/02
  See application file for complete search history.

(56) References Cited

U.S. PATENT DOCUMENTS

| 2,918,422 | A |   | 12/1959 | Evering et al. |
| 3,050,456 | A |   | 8/1962  | Melchior |
| 3,192,150 | A |   | 6/1965  | Taylor et al. |
| 3,617,494 | A |   | 11/1971 | Montgomery |
| 3,801,494 | A |   | 4/1974  | Moore et al. |
| 8,163,167 | B2 | * | 4/2012 | Himelfarb ............ C10G 45/02 208/143 |

FOREIGN PATENT DOCUMENTS

WO        2008092232 A1    8/2008

* cited by examiner

*Primary Examiner* — Lessanework Seifu

(57) ABSTRACT

Methods and apparatus for removing sulfur compounds from a hydrocarbon stream are disclosed. In one exemplary embodiment, a method for removing sulfur compounds from a hydrocarbon stream includes the steps of steam stripping a mixed hydrocarbon stream to form a steam stripped overhead stream comprising naphtha and lighter hydrocarbons and a steam stripped bottoms stream comprising naphtha and heavier hydrocarbons; fractionating the steam stripped bottoms stream to form a fractionated overhead stream comprising naphtha hydrocarbons; combining the steam stripped overhead stream with a portion of the fractionated overhead stream and an H2-rich makeup gas stream; and hydrodesulfurizing the combined stream to form an HDS reaction effluent stream.

20 Claims, 2 Drawing Sheets

METHODS AND SYSTEMS FOR REMOVING SULFUR COMPOUNDS FROM A HYDROCARBON STREAM

TECHNICAL FIELD

The technical field relates generally to hydrocarbon processing methods and apparatus. More particularly, the technical field relates to methods and apparatus for removing sulfur compounds from a hydrocarbon stream.

BACKGROUND

Petroleum refiners often produce desirable products such as turbine fuel, diesel fuel, and other products known as middle distillates, as well as lower boiling hydrocarbonaceous liquids such as naphtha and gasoline, by hydrocracking a hydrocarbon feedstock derived from crude oil. Feedstocks most often subjected to hydrocracking are gas oils and heavy gas oils recovered or derived from crude oil by distillation or by thermal or catalytic processes. A typical heavy gas oil includes a substantial portion of hydrocarbon components boiling above about 371° C. (about 700° F.), usually at least about 50% by weight boiling above 371° C. (about 700° F.). A typical vacuum gas oil normally has a boiling point range between about 315° C. (about 600° F.) and about 565° C. (about 1050° F.).

Hydrocracking is generally accomplished by contacting the gas oil or other feedstock with a suitable hydrocracking catalyst under conditions of elevated temperature and pressure in the presence of hydrogen so as to yield a product containing a distribution of hydrocarbon products desired by the refiner. The operating conditions and the hydrocracking catalysts chosen within a hydrocracking reactor influence the yield of the hydrocracked products.

There is thereby produced a reaction zone effluent stream that includes an admixture of the remaining hydrogen which is not consumed in the reaction, light hydrocarbons such as methane, ethane, propane, butane, and pentane formed by the cracking of the feed hydrocarbons, reaction by-products such as hydrogen sulfide and ammonia formed by hydrodesulfurization and hydrodenitrification reactions that occur simultaneously with the hydrocracking reaction. The reaction zone effluent will also contain the desired product hydrocarbons boiling in the naphtha, gasoline, diesel fuel, kerosene, or fuel oil boiling point ranges and some unconverted feed hydrocarbons boiling above the boiling point ranges of the desired products. The effluent of the hydrocracking reaction zone therefore includes an extremely broad and varied mixture of individual compounds.

The hydrocracking reaction zone effluent is typically removed from contact with the catalyst bed, heat exchanged with the feed to the reaction zone, and then passed into a vapor-liquid separation zone normally referred to as a high pressure separator. Additional cooling can be done prior to this separation. In some instances a hot flash separator is used upstream of the high pressure separator. The use of cold separators to remove condensate from vapor removed from a hot separator is another option. The liquids recovered in these vapor-liquid separation zones are passed into a product recovery zone containing one or more fractionation columns Product recovery methods for hydrocracking are well known and conventional methods may be employed.

Gas oils and other feedstocks may also include some level of impurities, such as sulfur and nitrogen. These impurities are often undesirable, and their removal from the hydrocracked product is typically sought. For example, due to environmental concerns and newly enacted rules and regulations, saleable fuels must meet lower and lower limits on contaminates, such as sulfur and nitrogen. New regulations require essentially complete removal of sulfur from diesel. For example, the ultra-low sulfur diesel (ULSD) requirement is typically less than about 10 wppm sulfur.

With regard to the removal of sulfur impurities, sulfur guard beds are often specified to treat hydrocracked naphtha where the sulfur concentration in the naphtha (as mercaptans arising from recombination reactions in the hydrocracking beds) must be guaranteed as suitable for naphtha reforming and/or isomerization processing downstream. These beds are non-regenerable, and the spent material is a very hazardous waste (carcinogenic, pyrophoric) and requires periodic disposal, which adds undesirable costs to the process.

Accordingly, it is desirable to provide improved methods and systems for removing sulfur impurities from hydrocracked hydrocarbon streams. Furthermore, it is desirable to provide such methods and systems that reduce the costs associated with sulfur impurity removal. Still further, it is desirable to provide such methods and system that do not require the use of non-regenerable components and that do not produce hazardous/toxic waste by-products. Embodiments of the present disclosure have the feature that the catalyst employed may be periodically regenerated, in situ or ex situ, at the same time that the system is periodically shut down for regularly scheduled maintenance. Furthermore, other desirable features and characteristics of the presently disclosed embodiments will become apparent from the subsequent detailed description and the appended claims, taken in conjunction with the accompanying drawings and this background.

BRIEF SUMMARY

Methods and systems for removing sulfur compounds from a hydrocarbon stream are disclosed. In one exemplary embodiment, a method for removing sulfur compounds from a hydrocarbon stream includes the steps of steam stripping a mixed hydrocarbon stream to form a steam stripped overhead stream comprising naphtha and lighter hydrocarbons and a steam stripped bottoms stream comprising naphtha and heavier hydrocarbons; fractionating the steam stripped bottoms stream to form a fractionated overhead stream comprising naphtha hydrocarbons; combining the steam stripped overhead stream with a portion of the fractionated overhead stream and an H2-rich makeup gas stream; and hydrodesulfurizing the combined stream to form an HDS reaction effluent stream.

In another exemplary embodiment, an apparatus for removing sulfur compounds from a hydrocarbon stream that includes a steam stripper that steam strips a mixed hydrocarbon stream to form a steam stripped overhead stream comprising naphtha and lighter hydrocarbons and a steam stripped bottoms stream comprising naphtha and heavier hydrocarbons; a fractionation column that fractionates the steam stripped bottoms stream to form a fractionated overhead stream comprising naphtha hydrocarbons; a means for combining the steam stripped overhead stream with a portion of the fractionated overhead stream and an H2-rich makeup gas stream; and a hydrodesulfurization (HDS) reactor that hydrodesulfurizes the combined stream to form an HDS reaction effluent stream.

In yet another exemplary embodiment, a process for removing sulfur compounds from a hydrocarbon includes the steps of steam stripping a mixed hydrocarbon stream to form a steam stripped overhead stream comprising naphtha and lighter hydrocarbons and a steam stripped bottoms stream comprising naphtha and heavier hydrocarbons, fractionating the steam stripped bottoms stream to form a fractionated overhead stream comprising naphtha hydrocarbons, and combining the steam stripped overhead stream with a portion of the fractionated overhead stream and an H2-rich makeup gas stream that comprises from 50-250 volume parts per million hydrogen sulfide. The process further includes hydrodesulfurizing the combined stream to form an HDS reaction effluent stream, wherein hydrodesulfurizing comprises contacting the combined stream with a Ni(Co)Mo γ-alumina supported catalyst and debutanizing the reaction effluent stream to form an H2, H2S stream, a C3/C4 product stream, and a naphtha bottoms stream.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments contemplated herein relate to methods and systems for sulfur compound removal (such as sulfur impurity compounds) from a hydrocarbon stream, such as a hydrocracked hydrocarbon stream. The embodiments described herein replace the sulfur guard bed solution (described above) with a conventional naphtha hydrodesulfurization step, which is positioned upstream of the debutanizer column in the typical hydrocracking/fractionation flow-scheme. The disclosed hydrodesulfurization step requires only once-through hydrogen contact, and the reactor is small relative to the upstream hydrocracking reactor. The hydrodesulfurization step can be achieved at a pressure only slightly higher than the operating pressure of the debutanizer itself, thus minimizing the need for additional compressor duty to be added to the system. The reactor charge heating and cooling needs are not significant and can be easily integrated with the fractionation flowscheme.

In the present disclosure, various values of temperature, pressure, flow rates, number of stages, feed entry stage number, etc. are recited in association with the specific examples described below; those conditions are approximate and merely illustrative, and are not meant to limit the described embodiments. Additionally, for purposes of this disclosure, when the terms "middle", "top" or "lower" are used with respect to a column, these terms are to be understood as relative to each other, i.e. that withdrawal of a stream from the "top" of the column is at a higher position than the stream withdrawn from a "lower" portion of the column. When the term "middle" is used it implies that the "middle" section is somewhere between the "upper" and the "lower" section of the column. However, when the terms "upper", "middle" and "lower" have been used with respect to a distillation column it should not be understood that such a column is strictly divided into thirds by these terms.

Figure 1:
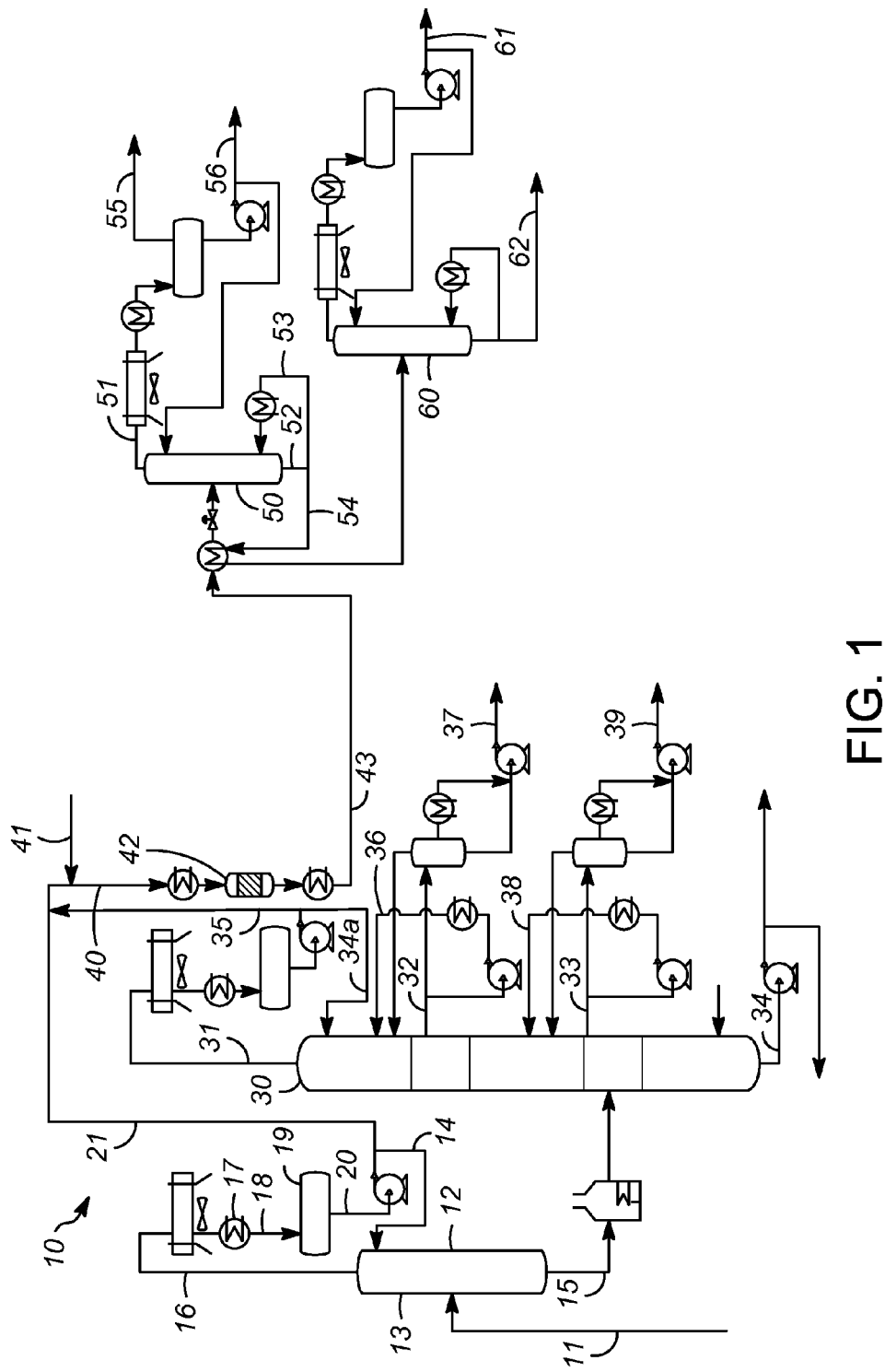
FIG. 1 is a schematic illustration of a system and a method for removing sulfur compounds from a hydrocarbon stream in accordance with an exemplary embodiment.

FIG. 1 is a schematic illustration of a system 10 employing a method for removing sulfur compounds from a hydrocarbon stream in accordance with an exemplary embodiment of the present disclosure. A hydrocracked hydrocarbon stream is introduced to system 10 via line 11. As noted above, the hydrocracked hydrocarbon stream may include an admixture of the remaining hydrogen which is not consumed in the reaction, light hydrocarbons such as methane, ethane, propane, butane, and pentane formed by the cracking of the feed hydrocarbons, reaction by-products such as hydrogen sulfide and ammonia formed by hydrodesulfurization and hydrodenitrification reactions that occur simultaneously with the hydrocracking reaction. Line 11 may also contain the desired product hydrocarbons boiling in the naphtha, gasoline, diesel fuel, kerosene, or fuel oil boiling point ranges and some unconverted feed hydrocarbons boiling above the boiling point ranges of the desired products. In FIG. 1, line 11 is introduced into steam stripped fractionation column 12. Steam is introduced by line (not separated illustrated) in a lower portion of steam stripped fractionation column 12 and travels upwardly through contacting zone 13 in order to strip volatile components from the downwardly flowing hydrocarbon feedstock. A hydrocarbon stream having a reduced concentration of volatile components is removed from steam stripped fractionation column 12 via line 15 and recovered. A vapor stream containing lower boiling hydrocarbons, which have been stripped from the feedstock, and steam is removed from steam stripped fractionation column 12 by line 16 and is introduced into heat-exchanger 17. A cooled and partially condensed stream containing steam condensate, liquid hydrocarbons and normally gaseous hydrocarbons is removed from heat-exchanger 17 via line 18 and introduced into stripper receiver 19. A liquid hydrocarbon stream is removed from stripper receiver 19 via line 20 and at least a portion is transported via line 14 and introduced into steam stripped fractionation column 12 as reflux and another portion is transported to further processing via line 21. The stripper receiver is designed to separate condensate water from the liquid hydrocarbons.

Hydrocarbon stream 15 continues to product fractionator 30. The process of separation and fractionation may be conducted in accordance with well known techniques. One exemplary process of separation and fractionation may be described as follows. The fractionator 30 may separate the hydrocarbon stream 15 into a plurality of product streams, including for example a light hydrocarbons and naphtha stream 31 (as an overhead product), a liquid stream 32 including unconverted kerosene (as an upper side cut), a liquid stream 33 including unconverted diesel (as a lower side cut), and a bottoms stream 34 from the fractionation column 30 that can include residual uncracked diesel fuel which can be recycled back to the hydrocracking stage or be used as fuel in the process heaters. This process can be carried out at a pressure between about 6 MPa and about 17 MPa, for example, between about 9 MPa and about 12 MPa, such as about 10 MPa.

The term "diesel fuel" is defined in accordance with the specifications defined in the American Society for Testing and Materials (ASTM). Specification D 975 and refers to a petroleum fraction comprised primarily of C10-C24 hydrocarbons (about 75 mass %), typically paraffins including straight-chained, branched, and cycloparaffins, and of aromatic hydrocarbons (about 25 mass %), such as alkylbenzenes and naphthalenes, and having distillation temperatures of about 260° C. at the 10% recovery point and about 340° C. at the 90% recovery point. The average net chemical formula for common diesel fuel is typically C12H26. The term "kerosene" is defined as a petroleum fraction containing hydrocarbons that are slightly heavier than those found in gasoline and naphtha, such as C9-C16 hydrocarbons, and having a boiling point at ambient pressure between about 150° C. and about 300° C. Further, the term "naphtha" refers to a petroleum fraction with an approximate boiling range between about 50° C. and about 200° C. As further known in the art, the terms "diesel fuel," "kerosene," and "naphtha" may be defined with regard to their well-known T5/T95 ranges.

Each of the above-described streams 31, 32, and 33 may include associated heat exchangers, condensers, or other means to produce a reflux stream and a product stream. Thus, the reflux stream from stream 31 is shown as stream 34a and the product stream therefrom is shown as stream 35. The reflux stream from stream 32 is shown as stream 36 and the product stream therefrom is shown as stream 37. Further, the reflux stream from stream 33 is shown as stream 38 and the product stream therefrom is shown as stream 39.

With continued reference to FIG. 1, the de-watered, steam stripper overhead liquid product 21 is mixed with a portion of the fractionator overhead product stream 35 (not all, can also be none) and/or another available feed naphtha (e.g. straight-run, etc.). This naphtha feed blend is then mixed with a hydrogen-rich gas stream 41, which preferably contains a small, but non-zero concentration of hydrogen sulfide (e.g. 50-250 vol. ppm), the blend of which shall be referred to as reactor charge stream 40. The small, non-zero concentration of hydrogen sulfide will help preserve the sulfide state of the downstream catalyst's active sites. The reactor charge is then heated preferably to a temperature of about 350-650° F., at about 100-500 psig, and more preferably to a temperature of about 450-550° F. at about 250-350 psig before entering a hydrodesulfurization ("HDS") reactor 42. The HDS reactor is filled principally with a Group VI metal and Group VIII metal/γ-alumina catalyst, with volume sufficient for 5-15 l/h liquid hourly space velocity processing of the reactor charge. The HDS reactor effluent stream 43 is then cooled to the required temperature for feeding a debutanizer column downstream.

FIG. 1 shows that the effluent stream 43 from the HDS may be sent to a debutanizer column 50. The debutanizer column 50 is in downstream communication with the reactor 42. The debutanizer column 50 may fractionate a portion of the HDS reactor effluent to provide a C4− overhead stream 51 and C5+ bottoms stream 52. A portion of the debutanizer bottoms in line 52 may be split between line 53 carrying debutanized naphtha as reflux, and line 54, which may direct debutanized naphtha to a naphtha splitter 60. The overhead stream 51 may be further separated into an H2, H2S stream 55 and a C3/C4 stream 56, as is known in the art. The naphtha splitter 60 may separate the debutanized naphtha stream 54 into light and heavy naphtha product streams 61 and 62, respectively, as is also known in the art.

Figure 2:
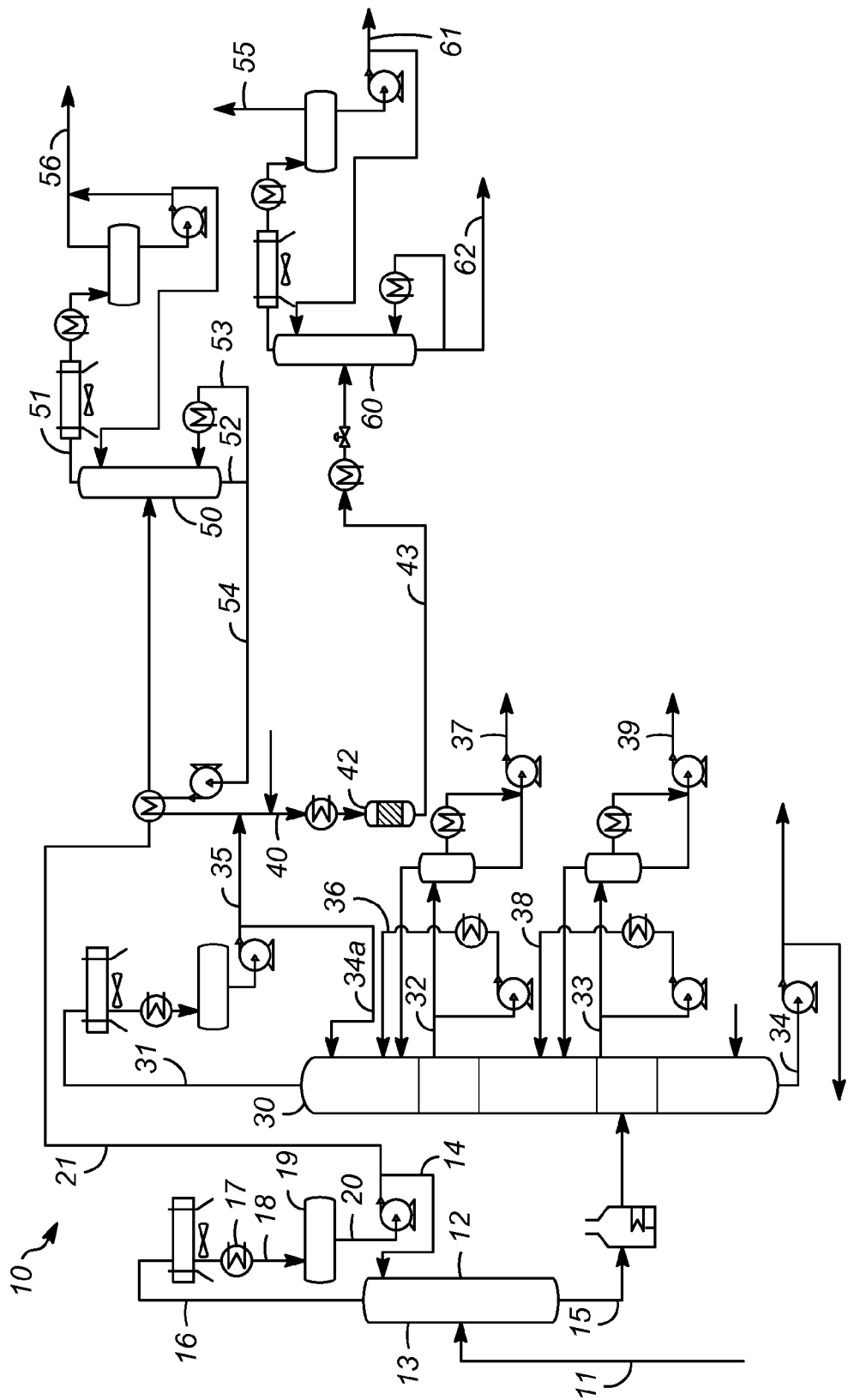
FIG. 2 is a schematic illustration of a system and a method for removing sulfur compounds from a hydrocarbon stream in accordance with another exemplary embodiment.

FIG. 2 provides an alternative embodiment of the present disclosure, which is similar to the embodiment shown in FIG. 1, except as noted herein. As shown in FIG. 2, the HDS reactor 42 is integrated after the debutanizer column 50. The stream 21 may provide the sole feed to the debutanizer column 50, and the stream 35 bypasses the debutanizer column 50. The bottom product stream 54 from the debutanizer column 50 combines with stream 35 and the H2 makeup to form the stream 40, which as noted above is the feed to the HDS reactor. Accordingly, in this embodiment, the H2/H2S stream 55 is removed after the naphtha splitter 60, instead of after the debutanizer column 50 as in FIG. 1.

Accordingly, the foregoing disclosure provides embodiments of methods and systems for sulfur compound removal (such as sulfur impurity compounds) from a hydrocarbon stream, such as a hydrocracked hydrocarbon stream. The embodiments described herein replace the sulfur guard bed solution (described above) with a conventional naphtha hydrodesulfurization step, which is positioned upstream of the debutanizer column in the typical hydrocracking/fractionation flow-scheme. The disclosed hydrodesulfurization step requires only once-through hydrogen contact, and the reactor is small relative to the upstream hydrocracking reactor. The hydrodesulfurization step can be achieved at a pressure only slightly higher than the operating pressure of the debutanizer itself, thus minimizing the need for additional compressor duty to be added to the system. The reactor charge heating and cooling needs are not significant and can be easily integrated with the fractionation flowscheme.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method for removing sulfur compounds from a hydrocarbon stream that comprises the steps of:
   steam stripping a mixed hydrocarbon stream to form a steam stripped overhead stream comprising naphtha and lighter hydrocarbons and a steam stripped bottoms stream comprising naphtha and heavier hydrocarbons;
   fractionating the steam stripped bottoms stream to form a fractionated overhead stream comprising naphtha hydrocarbons;
   combining the steam stripped overhead stream with a portion of the fractionated overhead stream and an H2-rich makeup gas stream; and
   hydrodesulfurizing the combined stream to form an HDS reaction effluent stream.

2. The method of claim 1, wherein the H2-rich makeup gas stream comprises from 50-250 volume parts per million hydrogen sulfide.

3. The method of claim 1, wherein fractionating the steam stripped bottoms stream further forms a first side cut stream comprising kerosene hydrocarbons.

4. The method of claim 3, wherein fractionating the steam stripped bottoms stream further forms a second side cut stream comprising diesel hydrocarbons.

5. The method of claim 4, wherein fractionating the steam stripped bottoms stream further forms a fractionated bottoms stream comprising a liquid recycle stream.

6. The method of claim 1, further comprising debutanizing the reaction effluent stream to form an H2, H2S stream, a C3/C4 product stream, and a naphtha bottoms stream.

7. The method of claim 6, further comprising splitting the naphtha bottoms stream to form a light naphtha stream and a heavy naphtha stream.

8. The method of claim 1, wherein hydrodesulfurizing comprises contacting the combined stream with a Ni(Co)Mo γ-alumina supported catalyst.

9. The method of claim 1, wherein a step of debutanizing precedes the step of hydrodesulfurizing.

10. The method of claim 1, wherein a step of debutanizing succeeds the step of hydrodesulfurizing.

11. An apparatus for removing sulfur compounds from a hydrocarbon stream that comprises:
   a steam stripper that steam strips a mixed hydrocarbon stream to form a steam stripped overhead stream comprising naphtha and lighter hydrocarbons and a steam stripped bottoms stream comprising naphtha and heavier hydrocarbons;
   a fractionation column that fractionates the steam stripped bottoms stream to form a fractionated overhead stream comprising naphtha hydrocarbons;
   a stream configuration that combines the steam stripped overhead stream with a portion of the fractionated overhead stream and an H2-rich makeup gas stream; and
   a hydrodesulfurization (HDS) reactor that hydrodesulfurizes the combined stream to form an HDS reaction effluent stream.

12. The apparatus of claim 11, wherein the H2-rich makeup gas stream comprises from 50-250 volume parts per million hydrogen sulfide.

13. The apparatus of claim 11, wherein fractionating the steam stripped bottoms stream further forms a first side cut stream comprising kerosene hydrocarbons.

14. The apparatus of claim 13, wherein fractionating the steam stripped bottoms stream further forms a second side cut stream comprising diesel hydrocarbons.

15. The apparatus of claim 14, wherein fractionating the steam stripped bottoms stream further forms a fractionated bottoms stream comprising a liquid recycle stream.

16. The apparatus of claim 11, further comprising a debutanizer that debutanizes the reaction effluent stream to form an H2, H2S stream, a C3/C4 product stream, and a naphtha bottoms stream.

17. The apparatus of claim 16, further comprising a naphtha splitter that splits the naphtha bottoms stream to form a light naphtha stream and a heavy naphtha stream.

18. The apparatus of claim 11, wherein hydrodesulfurizing in the HDS reactor comprises contacting the combined stream with a Group VI metal and Group VIII metal/γ-alumina supported catalyst.

19. The apparatus of claim 11, wherein a debutanizer is positioned upstream of the HDS reactor.

20. A process for removing sulfur compounds from a hydrocarbon stream that comprises the steps of:
   steam stripping a mixed hydrocarbon stream to form a steam stripped overhead stream comprising naphtha and lighter hydrocarbons and a steam stripped bottoms stream comprising naphtha and heavier hydrocarbons;
   fractionating the steam stripped bottoms stream to form a fractionated overhead stream comprising naphtha hydrocarbons;
   combining the steam stripped overhead stream with a portion of the fractionated overhead stream and an H2-rich makeup gas stream that comprises from 50-250 volume parts per million hydrogen sulfide;
   hydrodesulfurizing the combined stream to form an HDS reaction effluent stream, wherein hydrodesulfurizing comprises contacting the combined stream with a Ni(Co)Mo γ-alumina supported catalyst; and
   debutanizing the reaction effluent stream to form an H2, H2S stream, a C3/C4 product stream, and a naphtha bottoms stream.

* * * * *